United States Patent
Druse, Sr.

[11] Patent Number: 5,320,477
[45] Date of Patent: Jun. 14, 1994

[54] BALE CARRIER

[76] Inventor: Charles R. Druse, Sr., Box 40, Cambridge, Nebr. 69022

[21] Appl. No.: 5,885

[22] Filed: Jan. 15, 1993

Related U.S. Application Data

[63] Continuation-in-part of Ser. No. 861,062, Mar. 31, 1992, which is a continuation-in-part of Ser. No. 704,053, May 22, 1991, Pat. No. 5,123,800.

[51] Int. Cl.⁵ .............................. B60P 1/24; B60P 1/02
[52] U.S. Cl. .................................... 414/470; 414/245; 414/495; 414/911
[58] Field of Search .................... 298/11, 8 R, 18; 414/24.5, 470, 495, 545, 911

[56] References Cited

U.S. PATENT DOCUMENTS

| | | | |
|---|---|---|---|
| 2,032,840 | 3/1936 | Flowers | 298/18 |
| 3,826,515 | 7/1974 | Slayton | 280/106 T |
| 4,092,050 | 5/1978 | Sobeck | 298/18 |
| 4,138,159 | 2/1979 | Hall | 298/18 |
| 4,236,861 | 12/1980 | Grove | 414/495 X |
| 4,261,676 | 4/1981 | Balling, Sr. | 414/24.5 |
| 4,411,572 | 10/1983 | Hostetler | 414/24.5 |
| 4,470,747 | 9/1984 | Tichenor | 414/491 |
| 4,500,242 | 2/1985 | Beikman | 414/24.5 |
| 4,580,843 | 4/1986 | Lund | 298/18 |
| 5,076,752 | 12/1991 | Rader | 414/470 |
| 5,123,800 | 6/1992 | Druse | 414/470 |
| 5,180,271 | 1/1993 | Favden | 298/18 X |

FOREIGN PATENT DOCUMENTS 1463180  3/1989  U.S.S.R. .............. 414/24.5

Primary Examiner—Michael S. Huppert
Assistant Examiner—Janice Krizek
Attorney, Agent, or Firm—Zarley, McKee, Thomte, Voorhees & Sease

[57] ABSTRACT

A bale carrier for carrying first, second and third rows of bales. The first row of bales are positioned on cradles positioned at one side of the carrier while the second row of bales are positioned on cradles at the other side of the carrier. A third row of bales is positioned on the tops of the first and second rows. A hydraulic cylinder having a push-off arm at the upper end thereof is positioned between bales in the first and second rows and is adapted to engage the underside of the bale in the third row of the bales positioned thereon so that the bale in the third row will be moved upwardly and laterally with respect to the bales and will be dumped from the right side of the carrier.

4 Claims, 3 Drawing Sheets

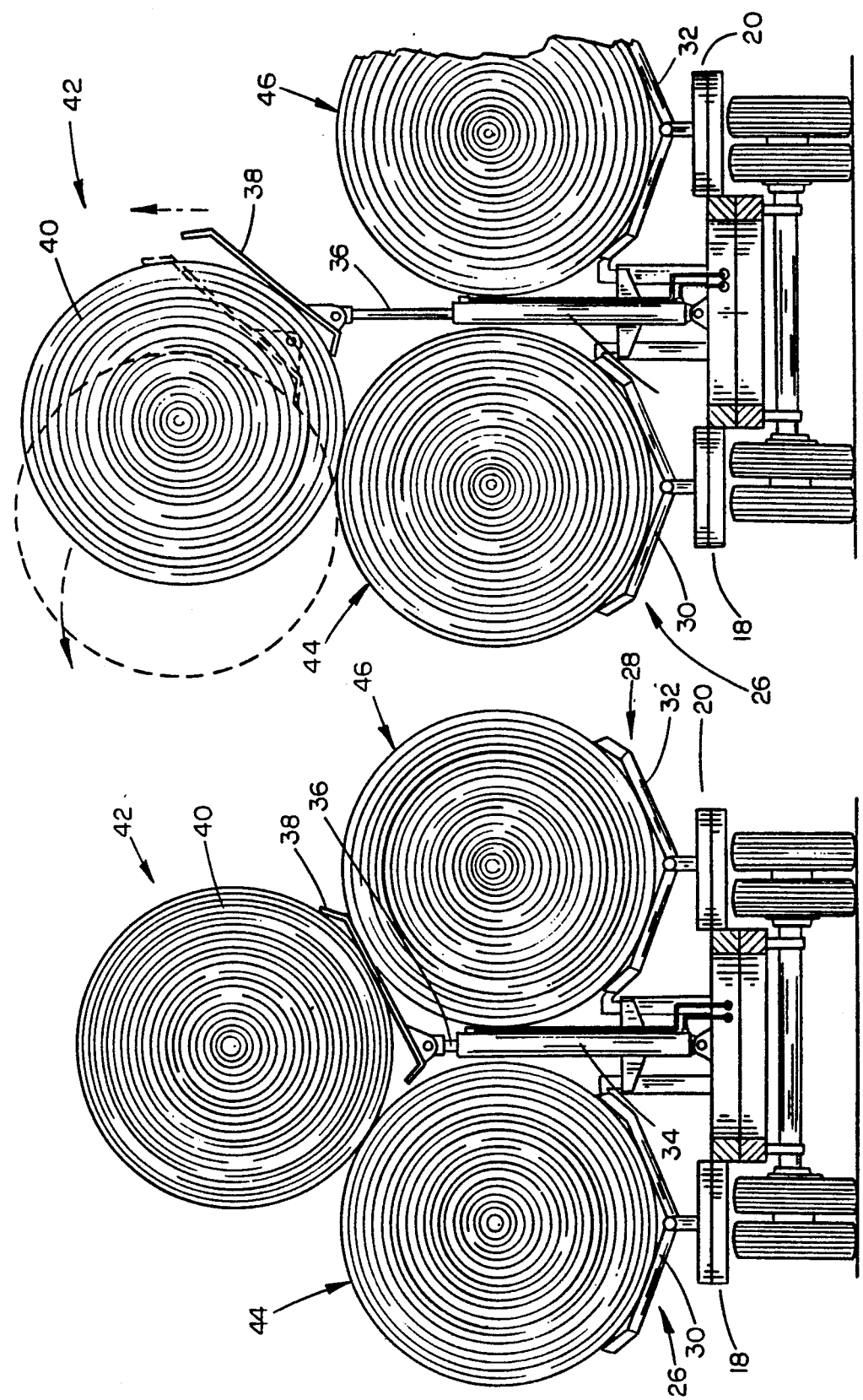

BALE CARRIER

CROSS REFERENCE TO RELATED APPLICATION

This is a continuation-in-part application of application Ser. No. 07/861,062 pending entitled "BALE CARRIER," filed Mar. 31, 1992, which was a continuation-in-part application of application Ser. No. 07/704,053 filed May 22, 1991, now U.S. Pat. No. 5,123,800.

BACKGROUND OF THE INVENTION

1. Field of the Invention

This invention relates to a bale carrier and more particularly to a bale carrier which is designed to carry first and second rows of bales with the bales in each row being arranged in an end-to-end relationship with the first and second rows being positioned adjacent one another and a third row of bales positioned on top of the first and second rows of bales. A means is provided for pushing the bales of the third row of bales from the bale carrier.

2. Description of the Related Art

Many types of apparatuses have been previously provided for carrying or transporting large round bales. Prior to applicant's invention of U.S. Pat. No. 5,123,800, applicant had no knowledge of any bale carriers which had the ability to discharge the bales therefrom at either side of the wheeled frame means which could take the form of a pick-up truck, truck or trailer. In the invention of U.S. Pat. No. 5,123,800, a bale carrier is disclosed wherein the bales are positioned on the carrier in an end-to-end relationship with the bale carrier having the ability to dump the bales from either side of the bale carrier. In the co-pending application of Ser. No. 07/861,062 filed Mar. 31, 1992, a bale carrier is disclosed wherein first and second rows of bales are positioned on the bale carrier with the bales in each of the rows being arranged in an end-to-end relationship. The bales in the first row can be dumped from one side of the carrier while the bales in the second row can be dumped from the other side of the carrier.

Although the bale carrier of U.S. Pat. No. 5,123,800 is believed to represent a significant advance in the art and although the bale carrier of Ser. No. 07/861,062 is believed to represent a significant advance over applicant's earlier bale carrier and the prior art, it has been found that it is desirable to be able to carry or transport a third row of bales on top of the first and second rows of bales. By positioning the third row of bales above the first and second rows of bales, the carrier is able to transport additional bales from one location to another. In conjunction with the ability to transport a third row of bales, it is desirable to be able to provide some mechanism on the carrier to dump the bales of the third row of bales from the bale carrier.

Therefore, it is a principal object of the invention to provide an improved bale carrier.

A further object of the invention is to provide a bale carrier wherein a third row of bales is positioned on top of first and second rows of bales.

Still another object of the invention is to provide a bale carrier of the type described including means for dumping or pushing the bales of the third row of bales from the bale carrier.

Still another object of the invention is to provide a bale carrier including the means for dumping or pushing the bales of the third row of bales in a direction which would not dump the bales onto the road in the event of a malfunction.

These and other objects of the present invention will be apparent to those skilled in the art.

BRIEF DESCRIPTION OF THE DRAWINGS

FIG. 3 is a front view of the bale carrier illustrating a third row of bales positioned on first and second rows of bales; and FIG. 4 is a view similar to FIG. 3 except that the bale from the third row of bales is being dumped from the first and second rows of bales such as illustrated in FIG. 1.

SUMMARY OF THE INVENTION

Figure 1:
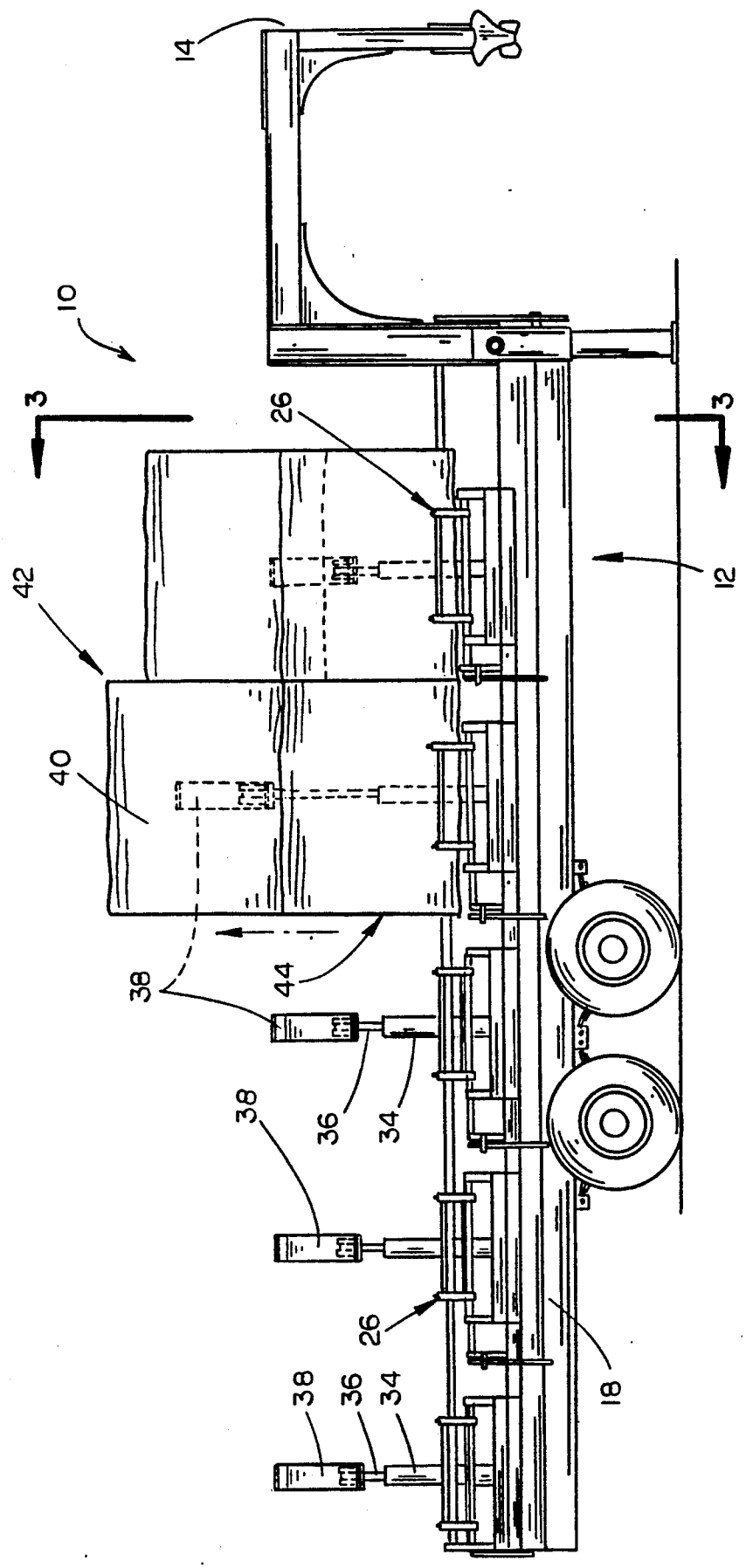
FIG. 1 is a side view of the invention illustrating a bale of the third row of bales being dumped therefrom.
Figure 2:
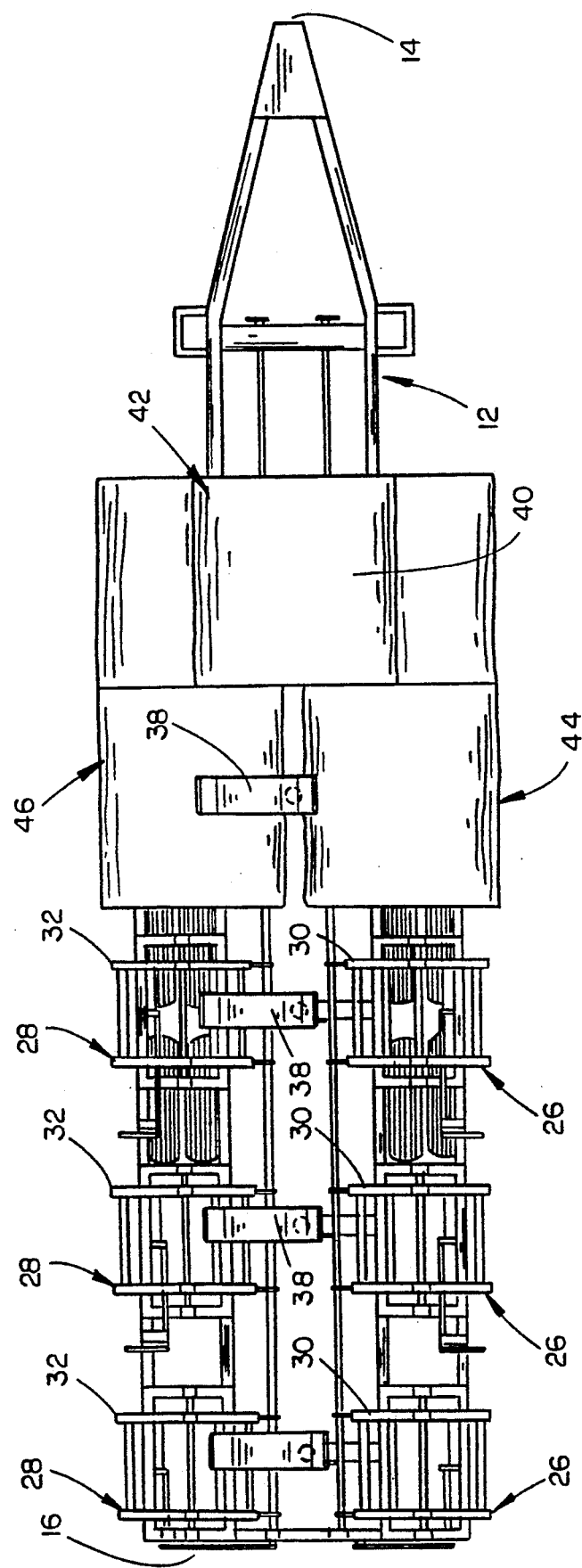
FIG. 2 is a top view of the bale carrier.

A bale carrier is described which comprises a wheeled frame means having a forward end, a rearward end, and opposite sides. A first row of bale cradles is selectively pivotally mounted, about a horizontal axis, on the frame means at one side thereof. A second row of bale cradles is selectively pivotally mounted, about a horizontal axis, on the frame means at the other side thereof. Each of the bale cradles in the first row is selectively pivotally movable from a normal bale supporting position to a first dumping position so that the hay bale thereon may be dumped therefrom along one side of the frame means. All of the bale cradles in the first row may be connected together so that they may all be simultaneously dumped, as desired. Each of the bale cradles in each of the second row is selectively pivotally movable from a normal bale supporting position to a first dumping position so that the hay bale thereon may be dumped therefrom along the other side of the frame means. All of the bale cradles in the second row may be operatively interconnected so that they will all simultaneously dump in unison.

A plurality of substantially vertically disposed hydraulic cylinders are mounted on the wheeled frame means between the first and second rows of bale cradles and extend upwardly therefrom. A push-off arm is mounted at the upper end of each of the hydraulic cylinders and is adapted to engage the underside of a bale in a third row of bales positioned on top of the first and second rows of bales. As the hydraulic cylinder is extended, the bale is pushed laterally from the right side of the bale carrier.

DESCRIPTION OF THE PREFERRED EMBODIMENT

The bale carrier of this invention is referred to generally by the reference numeral 10 and is of the type disclosed in my co-pending application, Ser. No. 07/861,062 filed Mar. 31, 1992, the disclosure of which is relied upon here to complete this disclosure. It should be noted that the bale carrier 10 in the drawings is illustrated as comprising a trailer. However, the bale carrier of this invention could be mounted on a truck or the like if so desired. Bale carrier 10 includes a wheeled frame means 12 having a forward end 14, a rearward end 16, and opposite sides 18 and 20.

A first row of bale cradles 26 is provided adjacent side 18 while a second row of bale cradles 28 is provided adjacent side 20. For purposes of description, row 26 will be described as including a plurality of bale cradles 30 while row 28 will be described as comprising a plurality of bale cradles 32. In the co-pending application, each of the bale cradles at one side of the carrier and each of the bale cradles at the other side of the carrier were individually pivotally mounted but could be dumped in unison. For the purposes of this invention, the bale cradles 30 may be individually pivotally mounted or may be connected so as to be simultaneously pivoted. Similarly, for the purposes of this invention, the bale cradles 32 may be individually pivotally mounted or may be interconnected so that they may be pivoted in unison. The mounting of the bale cradles does not form a part of this invention.

A plurality of vertically disposed hydraulic cylinders 34 are pivotally connected at their lower ends to the wheeled frame means 12 and extend upwardly between the bales in the first and second row of bale cradles as seen in the drawings. The hydraulic cylinders 34 are operatively connected to the hydraulic system of the truck or the like so as to permit the selective extension of the cylinder rod 36 therefrom. A push-off arm 38 is connected to the upper end of each of the rods 36 and is designed to engage the underside of a bale 40 which is in a third row of bales 42 positioned on top of the first row of bales 44 and the second row of bales 46. As seen in the drawings, push-off arm 38 is disposed at an angle with respect to the rod 36 so that the extension of the rod 36 from the hydraulic cylinder 34 will cause the bale 40 to be dumped from the right of the trailer, as viewed from the back of the trailer, so that the bale 40 will be dumped into the ditch as opposed to a roadway should a malfunction occur during the transport of the bales from one location to another.

In operation, the rods 36 of the cylinders 34 are normally extended while the bales in the first and second rows are being deposited in their respective cradles. The cylinder rods 36 will then be retracted until the push-off arm 38 rests against the top of one of the bales 46. A third row of bales will then be positioned on the tops of the first and second rows of bales. When it is desired to unload the bales, the bale in the third row of bales must be first removed before the bales 44 and 46 therebelow may be removed. The cylinders 34 are individually actuated so that the respective bale 40 will be pushed upwardly from the bales 44 and 46 and will be dumped to the right side of the bale carrier.

Thus it can be seen that a novel bale carrier has been provided which enables a third row of bales to be positioned on top of first and second rows of bales with means being provided to dump the third row of bales from the trailer without the necessity of using a separate piece of equipment to remove the bales of the third row of bales therefrom.

Thus is can be seen that the invention accomplishes at least all of its stated objectives.

I claim:

1. A hay bale handling apparatus, comprising,
   a frame means having a forward end, a rearward end, and opposite sides;
   a first bale cradle selectively pivotally mounted, about a horizontal axis, on said frame means at one side thereof;
   a second bale cradle selectively pivotally mounted, about a horizontal axis, on said frame means at the other side thereof;
   said first bale cradle being selectively pivotally movable from a normal bale supporting position to a first dumping position whereby the hay bale thereon may be dumped therefrom along said one side of said frame means;
   said second bale cradle being selectively pivotally movable from a normal bale supporting position to a first dumping position whereby the hay bale thereon may be dumped therefrom along said other side of said frame means;
   at least one vertically disposed hydraulic cylinder operatively secured to said frame means between said first and second bale cradles and extending upwardly therebetween, said hydraulic cylinder having a cylinder rod movably extending therefrom;
   a push-off arm means at the upper end of said cylinder rod adapted to engage the underside of a hay bale positioned on top of the hay bales positioned in said first and second bale cradles;
   said hydraulic cylinder and push-off arm means adapted to push the hay bale engaged thereby laterally from said frame means.

2. The hay bale handling apparatus of claim 1 wherein said hydraulic cylinder and push-off arm means push the hay bale from the right side of the frame means.

3. The hay bale handling apparatus of claim 1 wherein a plurality of first bale cradles and a plurality of second bale cradles are mounted on said frame means, and wherein a hydraulic cylinder is positioned between each of said first and second bale cradles.

4. The hay bale handling apparatus of claim 1 wherein said push-off arm means engages the underside of the hay bale at one side thereof so that the hay bale will be pushed upwardly and laterally from the bales on said first and second bale cradles.

* * * * *